United States Patent [19]

Peiji

[11] Patent Number: 4,922,781
[45] Date of Patent: May 8, 1990

[54] CYCLOIDAL EQUIDISTANT CURVED GEAR TRANSMISSION MECHANISM AND ITS DEVICE

[76] Inventor: Shen Peiji, Lane 240, No. 13-201 An Shun Road, Shanghai, China

[21] Appl. No.: 38,378

[22] Filed: Apr. 15, 1987

Related U.S. Application Data

[63] Continuation-in-part of Ser. No. 38,086, Apr. 14, 1987, abandoned.

[51] Int. Cl.$^5$ ............... F16H 55/06; F16H 55/08; F16H 1/28; F01C 1/10
[52] U.S. Cl. ............... 74/462; 418/171; 475/180; 475/344
[58] Field of Search ............... 74/804, 805, 801, 462; 418/171, 206

[56] References Cited

U.S. PATENT DOCUMENTS

| | | | |
|---|---|---|---|
| 1,682,563 | 8/1928 | Hill | 74/462 |
| 1,828,795 | 10/1931 | Webb | 74/804 |
| 1,833,993 | 12/1931 | Hill | 74/804 |
| 2,031,888 | 2/1936 | Hill | 74/462 |
| 2,091,317 | 8/1937 | Hill | 74/462 |
| 2,209,201 | 7/1940 | Hill | 74/462 |
| 2,481,627 | 9/1949 | Sharpe | 74/804 |
| 2,960,884 | 11/1960 | Hill | 74/462 |
| 2,972,910 | 2/1961 | Menge, Sr. | 74/804 |
| 3,209,611 | 10/1965 | Iyoi | 74/462 |
| 3,383,931 | 5/1968 | Paterson, Jr. | 74/804 |
| 3,574,489 | 4/1971 | Pierrat | 74/804 |
| 3,946,621 | 3/1976 | Rouverol | 74/462 |
| 4,005,619 | 2/1977 | Schmermund | 74/804 |
| 4,008,018 | 2/1977 | McDermott | 418/171 |
| 4,155,686 | 5/1979 | Eisenmann et al. | 74/462 X |
| 4,398,874 | 8/1983 | Eisenmann | 74/804 |
| 4,452,102 | 6/1984 | Shaffer | 74/804 |
| 4,673,342 | 6/1987 | Saegusa | 74/804 X |
| 4,823,638 | 4/1989 | Ishikawa | 74/462 X |
| 4,827,800 | 5/1989 | Pedersen et al. | 74/805 |

FOREIGN PATENT DOCUMENTS 0155944 12/1980 Japan ............... 74/804

Primary Examiner—Leslie A. Braun
Assistant Examiner—Harold F. Macris
Attorney, Agent, or Firm—Pennie & Edmonds

[57] ABSTRACT

This invention involves a gear transmission mechanism and its device which incorporate double cycloidal equidistant conjugated gear mechanisms and devices, featuring in that a whole branch cyclic cycloidal equidistant curve at a side of the center of curvature of that cycloid is applied with the value of equidistance equal to or smaller than the radius of the rolling circle as the original tooth profile and thus conjugated mutually enveloping cycloidal equidistant curved gear mechanisms with one-tooth-difference, zero-tooth-difference or multi-tooth-difference can be made according to the requirement. Motor pumps and reducers made according to these mechanisms have the advantages of smaller sliding coefficient, smaller pressure angle, greater speed ratio range, lower noise, better strength, higher efficiency, more convenience in machining and lower cost. Therefore these mechanisms can be used to effectively replace the cycloidal lantern gearing with promising development of novel gear transmissions.

5 Claims, 15 Drawing Sheets

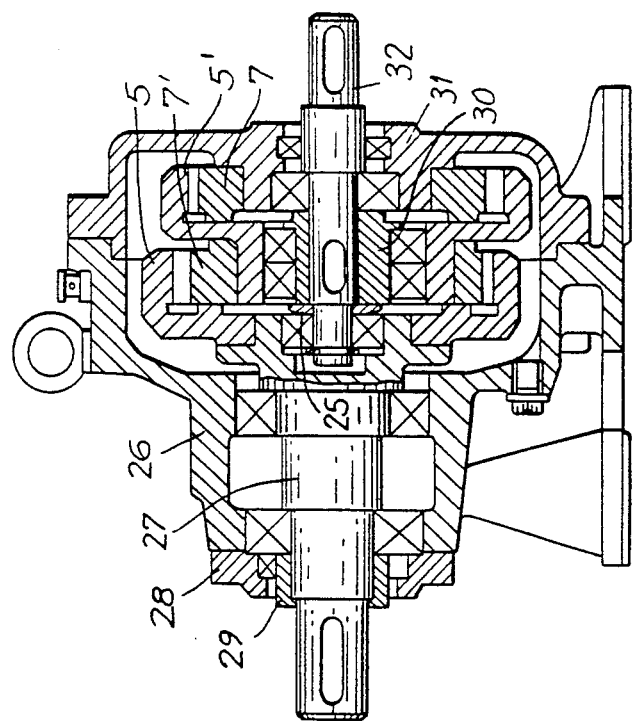
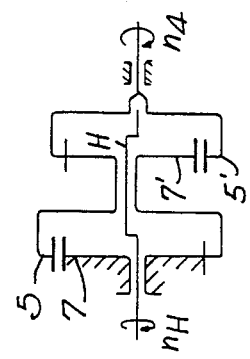
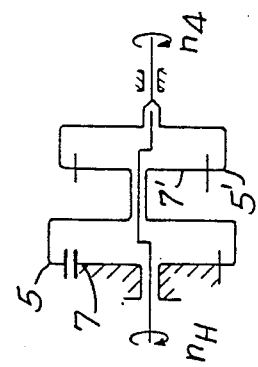
FIG.15(c)
FIG.15(a)
FIG.15(b)

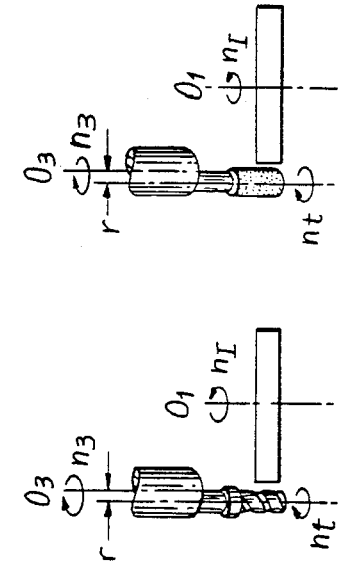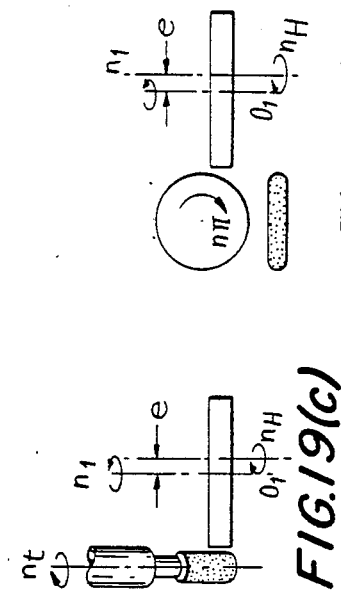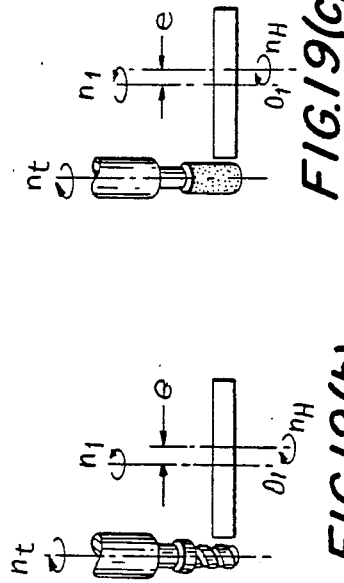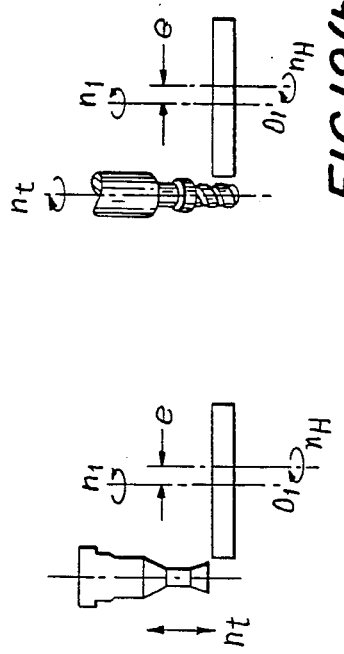

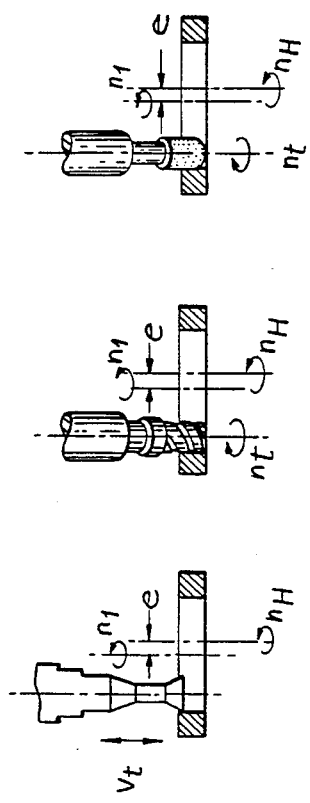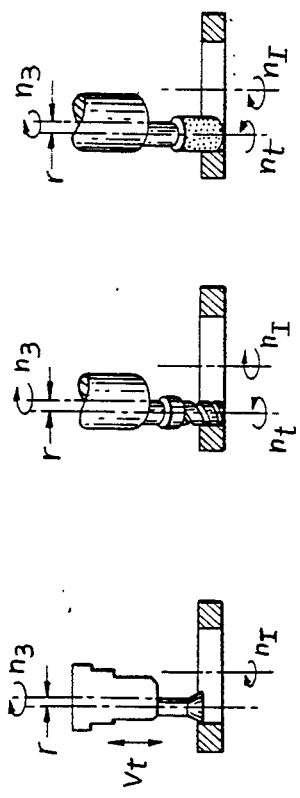

CYCLOIDAL EQUIDISTANT CURVED GEAR TRANSMISSION MECHANISM AND ITS DEVICE

CROSS-REFERENCE TO RELATED APPLICATIONS

This application is a continuation-in-part, now abandoned, of application Ser. No. 038,086, entitled "Cycloidal Equidistant Curved Gear Transmission Mechanism And Its Device", filed Apr. 14, 1987, which is incorporated herein by reference.

This invention involves a gear transmission mechanism and its device and especially relates to the conjugated gear transmission mechanisms with internal and/or external gears of whole branch cyclic cycloidal equidistant curves and the various devices constituted by them.

The well-known typical cycloidal gear transmission mechanisms are clock gears and cycloidal lantern gear mechanisms. The clock gears transmission power is low and can only be applied to instruments for motion transmission. The transmission principles of such gears are to use circular arcs instead of epicycloids and straight lines instead of hypocycloids for their gear tooth profiles; therefore, in clockwork they are actually an approximation of the cycloidal gearing, i.e. applying only a small portion of the cycloid. Thus, either in theory or in practice, smooth transmission cannot be maintained.

Cycloidal lantern gear transmission mechanisms may transmit greater power with higher efficiency and also have the merit of compactness in configuration and structure. They are suitable for gear oil pumps, speed reducers, etc. and have found wide application in various equipments used in national defence, mining, metallurgy, chemical engineering, textile and many other industries. However, most, if not all, embodiments of cycloidal lantern gear transmission mechanisms are complex and difficult to make, with the main drawback being that manufacturing errors are likely to accumulate and high accuracy is hard to attain. In the cycloidal lantern gear machines, the theoretical tooth profiles of the lantern gears are points uniformly distributed on the end surface instead of lines; therefore, the theoretical contours of the lantern gears and the cycloidal gears are not a pair of conjugate curve mechanisms, their actual tooth profiles are circular arcs and pan-cycloids, unable to be complete envelope curves to each other. In manufacturing, they cannot be made by conventional generating methods, but must be made tooth-by-tooth and piece-by-piece and then assembled. Moreover, the cycloidal lantern gears are meshing of circular arcs-pan-cycloids outside the instantaneous center line, their pressure angles and relative sliding speeds are relatively great (since the sliding coefficient of the lantern gear is greater, the lantern teeth are usually provided with sleeves to prevent excessive concentrated wear).

At present, devices constituted by cycloidal lantern gears, such as rotor pumps, are widely employed, domestically and abroad. The cycloidal rotor are provided with tooth profiles of circular arcs, pan-cycloids and curtate epicycloidal inner equidistant curves. Since the theoretical contour of the external rotor of such tooth form is formed by points uniformly distributed on the circumference of the deteriorated cycloid, it cannot be referred to as a pair of conjugate curved gear mechanisms, in spite of the fact that the equidistant curve is a segment of a circular arc. As stated above, arcs of pan-cycloids cannot become complete enveloping curves with respect to each other because their coincidence depends on multi-point contacts instead of conjugation between tooth profiles of mutually enveloping curves. These drawbacks in meshing principle lead to a series of technical defects in practical applications, especially, that the external rotor tends to wear excessively, increase of transmission efficiency is impossible, etc.; thus, restricting application in high-pressure oil pumps. In regard to speed reducers, the low efficiency of the cycloidal lantern gears' plunger-like output mechanism, the difficulty in manufacturing and the serious restrictions on the size of the rotational arm as imposed by the gears of such a construction have significantly limited enhancement of the transmission power and, thus, the possibilities for broad application of cycloidal lantern gears.

The aim of the present invention is to improve and further develop currently available cycloidal gear transmissions, in order to provide a variety of new types of cycloidal equidistant curved gear transmission mechanisms and devices, featuring especially the employment of a complete branch of a cycloidal equidistant curve, in order to make the conjugate cycloidal equidistant curves of a pair of gears envelope each other and become internally meshing at the instantaneous center line, so as to overcome the drawbacks of the available techniques, further enhance the transmission deficiencies and performances and extend the scope of applications. The cycloidal equidistant curved gear transmission mechanisms of this invention can be utilized to produce oil pumps and epicycloidal equidistant curved gear reducers of broader transmission ratio and power.

The said cycloidal equidistant curved gears employ a complete branch of a cycloidal equidistant curve and in the realization of a transmission having internal meshing at the instantaneous center line, either the actual or theoretical tooth profiles of the pair of transmission gears are conjugate curved gear mechanisms, entirely observing the fundamental principles of toothed gearing, i.e., the common normal at the gear profile contact points intersect the center line at a certain point, forming conjugate, mutually enveloping cycloidal equidistant curved gears that ensure a smooth transmission, the centers of curvature of the tooth profiles of a pair of cycloidal equidistant curved gears lay at the same side and concave and convex meshing is possible in order to increase the contact strength, greatly enhance the transmission performance, achieve more compact structure than that of cycloidal lantern gears and significantly lower the manufacturing cost and labor intensity in comparison to the application of the typical generating method.

The conditions of formation of cycloidal equidistant curved gears' meshing are based upon the fact that in the relative motions of the two base circles and one rolling circle (the smallest) to form simultaneous, instantaneous center line mechanism, the three tangential circles at a point are in simple rolling contact and the pair of cycloids—in general sense, the prolate or curtate epi- or hypocycloids—as well as the equidistant curves formed relative to the two basic circles by a point adhered with the rolling circle and may locate within or outside or on the circumference of the rolling circle are all constituting enveloping curves relative to each other; whereas the meshing cyclic cycloidal conjugate curve mechanism may achieve continuous or multi-point meshing as far as the requirement of "three points in a same line", i.e., the instantaneous center point forming the small rolling circle, the instantaneous center point and the forming point forming the large rolling circle are located on the same straight line is satisfied.

Now, by reference to FIGS. 1 to 21, the details of the specific constructions of this invention will be given.

FIGS. 15a, 15b and 15c are schematic diagrams showing the construction and transmission of a planetary gear reducer constituted by epicycloidal equidistant curved binary internal and external gears with the external gear fixed and having internal gear output.

FIGS. 18a, 18b and 18c are schematic diagrams showing the external machining of epicycloidal inner-equidistant external gears.

FIGS. 19a, 19b, 19c and 19d are schematic diagrams showing the compound machining of epicycloidal inner-equidistant external gears.

FIGS. 20a, 20b and 20c are schematic diagrams showing the internal machining of hypocycloidal outer-equidistant small circles.

FIGS. 21a, 21b and 21c are schematic diagrams showing the internal roll machining of hypocycloidal outer-equidistant large circles.

Figure 1:
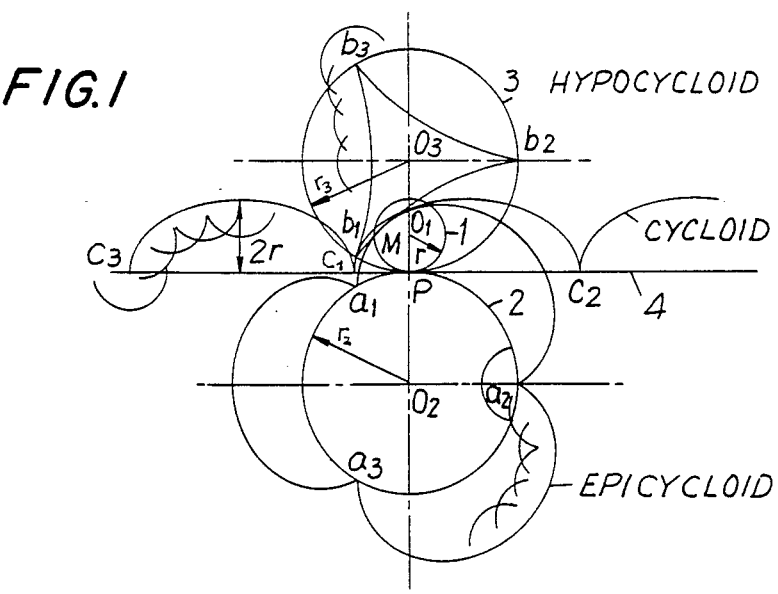
FIG. 1 is a schematic diagram showing the generation of a cycloidal equidistant curved gear.

In a typical method of generating a cycloidal equidistant gear as shown in FIG. 1, the results of the transition machining of the unextended-cycloidal—with curtate coefficient or extension coefficient of unity—equidistant tooth root shows that such transition machining occurring at a value of the equidistance smaller than or equal to the curvature radius intersects the arc of the tooth root, i.e., the cycloidal initial equidistance, causing the curve of the tooth profile to be unable to transit smoothly and causing the generation of crests. Such a case tends to worsen as the equidistance is increased and vice versa. FIG. 1 shows rolling circle (1) with rolling radius r, basic circle (2) with radius $Q_2$, basic circle (3) with radius $Q_3$ and base line (4) with infinite radius. When rolling circle (1), base circles (2) and (3), and base line (4) are respectively in pure rolling contact, they are tangent at point P and are rotating around their respective centers $O_1$, $O_2$, $O_3$ and $O_4$, the latter of which is at an infinite distance (not shown), the point M on the rolling circle (1) will form epicycloids $a_1$, $a_2$, and $a_3$, hypocycloids $b_1$, $b_2$ and $b_3$ as well as cycloids $c_1$, $c_2$ and $c_3$ respectively on the base circles (1) and (2) and base line (4). It can be seen from the characteristics of the cycloids that the curvatures of the epicycloids are relatively large and those of the hypocycloids relatively small, whereas the curvatures of the cycloids are intermediate of them. At the initial points of these three kinds of cycloid, for example, around points $a_1$, $b_2$ and $c_3$, it is not possible to obtain their equidistant curves. The equidistant curves generally could not be carried out on a section of cycloids where the radius of curvature is smaller than the equidistant value, however arcs with equidistant values equal to the radii and the initial points of cycloids as center of curvature are permissible. The arc sections smaller than or equal to the values of the equidistances on the epicycloids $a_1$, $a_2$ and $a_3$ are obviously larger, whereas those on the hypocycloids $b_1$, $b_2$ and $b_3$ are smaller and those on the cycloids $c_1$, $c_2$ and $c_3$ are intermediate of them. The equidistant curves of the hypocycloids are generally smoother and more perfect than those of the epicycloids, while equidistant curves of the cycloid are generally intermediate thereinbetween.

When the radius r of the rolling circle is taken as the value of the equidistance for the cycloidal equidistant curve, the amount of interference—i.e., the normal amount of the transition machining at the limit point—is as much as 0.27% of the equidistance r. Thus, the interference of the epicycloidal equidistant curve is slightly larger than that value and that of the hypocycloid is slightly smaller than the same.

Now, we may see the equations of the cycloidal equidistant initial tooth profile (basic gear rack). When the radius r of the rolling circle is taken as the value of the equidistance, then $$x = r\left(\frac{\theta}{180°}\pi - \sin\theta + \cos\frac{\theta}{2}\right) \quad (1)$$

$$y = r\left(1 - \cos\theta - \sin\frac{\theta}{2}\right)$$

The parameter $\theta$ in the formulae is the rotational angle of the rolling circle in degrees (°). The coordinates of the limit point approaching transition machining are:

$x = 0.99374300r$ $y = 0.11167706r$

The value of the parameter corresponding to the limit point is: $\theta° = 38.734°$.

Hence, valuation of the parameter corresponding to the limit point is: $\theta°$ to $360° - \theta$: namely, the range of 38.7° to 321.3°. The remaining portion of the cycloidal equidistant curve is the arc, the center point of which is at the cycloidal initial point and the value r of the equidistance as its radius. Such a characteristic is also applicable to the equidistant curve of the epi- and hypocycloids.

The standard numerical series of the recommended radius (units in mm) of the rolling circle are 1.0, 1.25, 1.5, 1.75, 2.0, 2.5, 3.0, 3.5, 4.0, 4.5, 5.0, 5.5, 6.0, 6.5, 7.0, 7.5, 8.0, 9.0, 10.0, 12.0, 14.0, 16.0, 18.0, 20.0.

The equations of the profile, limit point, radius of curvature and the geometric calculation of the epicycloidal inner equidistant curved gear—the radius r of the rolling circle is taken for all values of the equidistance are:

Tooth profile equations:

$$x = r\left[(Z+1)\sin\theta - \sin(Z-1)\theta + \frac{\sin(Z+1)\theta - \sin\theta}{(2-2\cos Z\theta)^{\frac{1}{2}}}\right] \quad (2)$$

$$y = r\left[(Z+1)\cos\theta - \cos(Z+1)\theta \frac{\cos\theta \cos(Z+1)\theta}{(2+2\cos Z\theta)^{\frac{1}{2}}}\right]$$

where:
Z: number of teeth
r: radius of rolling circle and equidistant value
$\theta$: cycloidal angle of the basic circle relative to the center of the rolling circle. When a branch cycloid is required, $\theta$ is from 0° to 360°/Z (the actual tooth profile $\theta$ should be from $\theta°$ to $360°/Z - \theta°$) [as will be seen in the following formula (3)], the remain takes r as its radius of the arc.

The coordinates of the theoretical limit point and the actual limit point:

The theoretical limit point is the epicycloidal equidistant curve and the theoretical curve: the curvature radius on the epicycloid equalized to the corresponding point of the equidistance r is the theoretical limit point of both the equidistant curve and the tooth-base arc (with radius r) and its parameter is:

$$\theta = \frac{1}{Z}\cos^{-1}\left\{1 - \frac{[Z+2]^2}{(Z+1)8^{\frac{1}{2}}}\right\} \quad (3)$$

The actual limit point is the intersecting point between the tooth base arc (with radius r) and the epicycloidal inner equidistant curve, and its parameter is:

$$1 = (2Z^2 + 2Z + 3) + 2Z\cos(Z+1)\theta° + \quad (3')$$

$$\frac{2Z(\cos\theta - \cos(Z+1)\theta)}{(2 - 2\cos Z\theta°)^{\frac{1}{2}}} -$$

$$2(Z^2 + Z)\cos\theta° - 2(Z+1)\cos Z\theta° - (Z+2)(2 - 2\cos Z\theta°)^{\frac{1}{2}}$$

With the value of the theoretical limit point 0 resulting from formula (3) being taken as a criterim, the resolution of formula (3') obtained by trial and error method gives the value $\theta$ of the actual limit point (intersection point), then it is used to substitute for formula (2) to obtain the coordinates of the intersecting point.

The curvature radius of the epicycloidal equidistant curve:

$$\rho = r\left[\frac{(Z+1)8^{\frac{1}{2}}}{Z+2}(1 - \cos Z\theta)^{\frac{1}{2}} - 1\right] \quad (4)$$

It can be seen from formula (4) that the fewer the number of teeth, the greater the epicycloidal curvature will be, and in turn, the fewer the number of teeth, the worse the transition mechanism will be. Therefore, it is advantageous to take a greater number of teeth for the epicycloidal equidistant curved gear.

The calculation formulas for different geometries of the epicycloidal equidistant curves are as follows: Radius of the base circle (equal to pitch radius $r_1$ or $r_2$)

$$r_b = Z \cdot r \quad (5)$$

Radius of the addendum circle (the equidistance is equal to the radius r of the rolling circle)

Outer gear $R_a = r_b + r$ \quad (6)

Inner gear $R_a = r_b - r$ \quad (7)

Radius of the root circle (the equidistance is equal to the radius r of the rolling circle)

Outer gear $R_f = r_b - r$ \quad (8)

Inner gear $R_f = r_b + r$ \quad (9)

Center distance of the internal meshing:

$$a = r_{b2} - r_{b1} = r_2 - r_1 \quad (10)$$

Helical angle of the helical gear:

$$\beta \geq \tan^{-1} \pi r/b \quad (11)$$

Where b is the gear width.

The calculation formulas for the tooth profile of the hypocycloidal equidistant curved gear: limit point curvature radius and the geometry (equidistant value is taken as radius r for the rolling circle).

Equation of tooth profile:

$$X = r\left[(Z-1)\sin\theta - \sin(Z-1)\theta + \frac{\sin(Z-1)\theta + \sin\theta}{(2 - 2\cos Z\theta)}\right]^{\frac{1}{2}} \quad (12)$$

$$Y = r\left[(Z-1)\cos\theta + \cos(Z-1)\theta + \frac{\cos\theta - \cos(Z-1)\theta}{(2 - 2\cos Z\theta)}\right]^{\frac{1}{2}}$$

Where:
Z: number of teeth
r: radius of rolling circle and equidistance
θ: cycloidal angle of the basic circle relative to the center of the rolling circle, and when a branch of cycloid is required, θ is from 0° to 360°/Z (the actual tooth profile should be from θ° to 360/Z − θ° as shown in formula (13) below, the rest is the arc with radius as r:

The coordinates of the theoretical and actual limit points:
The parameter of the theoretical limit point:

$$\theta \circ = \frac{1}{Z} \cos^{-1}\left(1 - \left[\frac{Z-2}{(Z-1) \, 8^{\frac{1}{2}}}\right]^2\right) \quad (13)$$

The parameter of the actual limit point (the intersecting point between radius r of the gear addendum are and the hypocyloidal external equidistant curve):

$$1 = (2Z^2 - 2Z + 3) + 2(Z-1)\cos Z\theta \circ + \quad (13') $$

$$(Z-2)(2 - 2\cos Z\theta \circ)^{\frac{1}{2}} -$$

$$2Z(Z-1)\cos\theta_\theta -$$

$$2Z\cos(Z-1)\theta \circ 2Z \frac{\cos\theta° - \cos(Z-1)\theta°}{(2 - 2\cos Z\theta°)^{\frac{1}{2}}}$$

The resulting theoretical limit point θ° obtained from formula (13) being taken as criterion for resolving, by trial and error method, formula (13') to obtain the value θ° of the actual limit point (intersecting point), which is the need to substitute for formula (12) to obtain the coordinates of the intersecting point.

The radius of curvature the hypocycloidal equidistant curved gear:

$$\rho' = r\left[\frac{(Z-1)8^{\frac{1}{2}}}{Z+2}(1 - \cos Z\theta)^{\frac{1}{2}} - 1\right] \quad (14)$$

It can be seen from formula (14) that the radius of curvature of the hypocycloidal curved gear decreases along with the reduction of the number of teeth.

It is preferable, therefore, to have a lesser number of teeth in order to achieve light transition machining to the tooth of the hypocyloidal equidistant curved gear.

The calculation formulas for other geometries of the hypocycloidal equidistant curved gear:

Radius of the basic circle r (equal to pitch radius)

$$r_b = Zr \quad (15)$$

Radius of addendum circle (radius r of rolling circle as equidistance)

External gear $R_a = r_b + r$ (16)

Internal gear $R_a = r_b - r$ (17)

Radius of root circle (radius r of the rolling circle as equidistance)

External gear $R_f = r_b - r$ (18)

Internal gear $R_f = r_b + r$ (19)

Center distance of internal meshing $$a = r_{b2} - r_{b1} = r_2 - r_1 \quad (20)$$

Helical angle of the helical gear $$\beta = \tan^{-1}\frac{\pi r}{b} \quad (21)$$

Where b is gear widthness.

Figure 2:
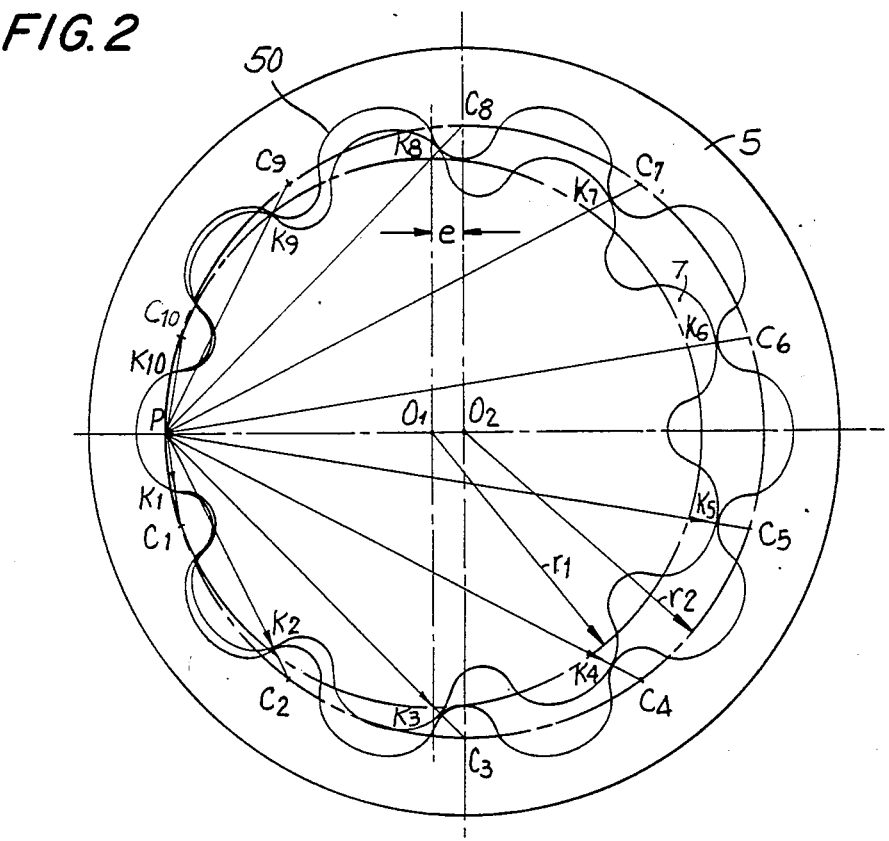
FIG. 2 is a schematic diagram showing the epicycloidal equidistant conjugate gear mechanism of internal meshing, one-tooth-difference, multi-point contacts.
Figure 3:
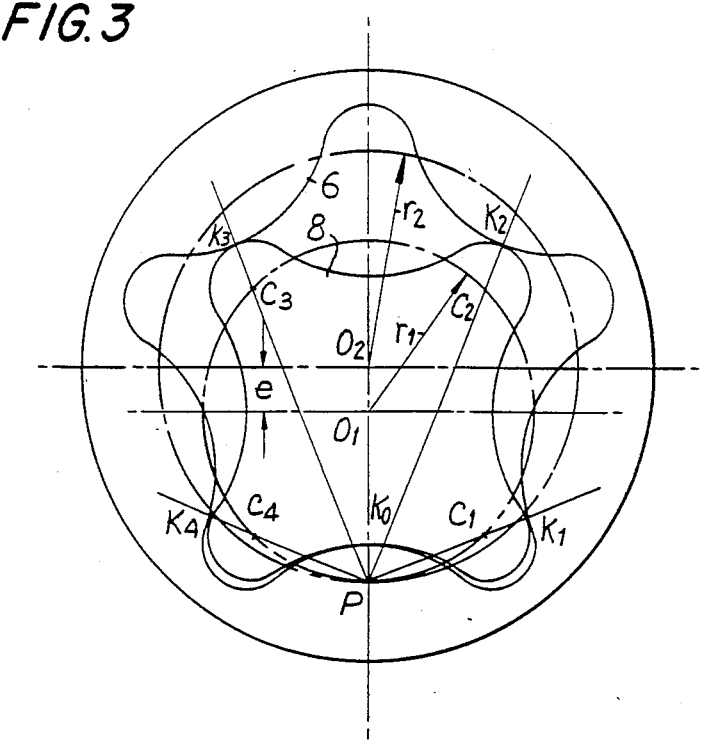
FIG. 3 is a schematic diagram showing the hypocycloidal equidistant conjugate gear mechanism of internal meshing, one-tooth difference, multipoint contacts.
Figure 4:
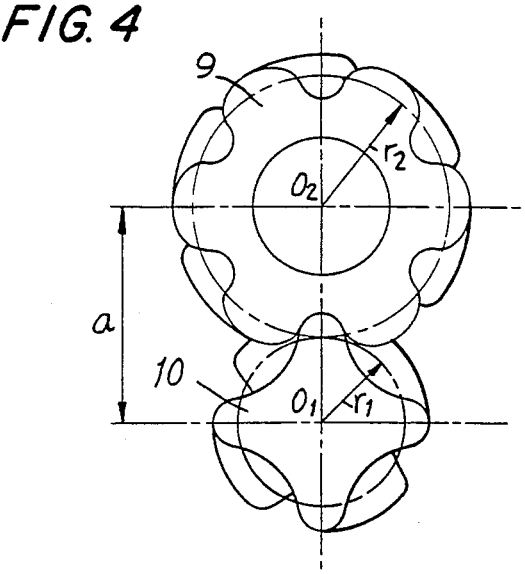
FIG. 4 is a schematic diagram showing hypo- and epicycloidal equidistant conjugate helical gear mechanism of external meshing, single-point contact.
Figure 13:
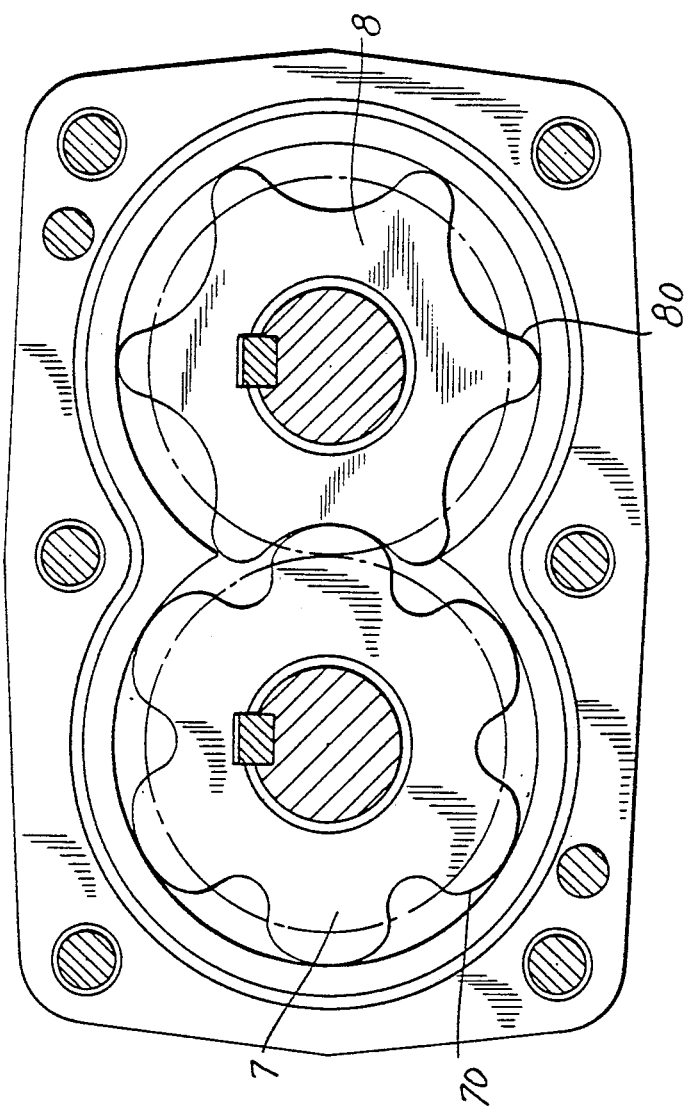
FIG. 13 is a schematic diagram showing the construction of a rotor pump constituted by external meshing of hypo- and epi-cycloidal equidistant curved gears.

FIG. 4 and FIG. 13 are the schematic diagrams of the transmission mechanisms of a pair of cycloidal equidistant gears meshing externally, where the tooth profile (70) of an epicycloidal inner equidistant curves gears (7)(9) and the tooth profile (80) of hypocycloidal outer equidistant curved gears (8)(10) are at mutual conjugation: whereas at the internal meshing, the conjugations are between the tooth profiles (50, 70) of the two epicycloidal inner equidistant curved gears (5, 7) as shown in FIG. 2 and between the tooth profiles (60, 80) of the two hypocycloidal outer equidistant curved gears (6, 8) as shown in FIG. 3 with tooth number difference to all of the said gears larger than and/or equal to 1. For internal meshing with tooth number difference of larger than one tooth between the external meshing and the gear, the skew tooth is applied. The example as shown in FIG. 4 mentioned above is the skew tooth with tooth number difference larger than one tooth.

Figure 5:
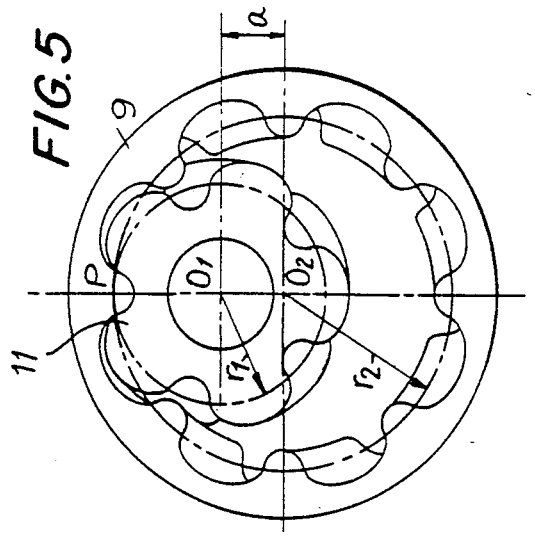
FIG. 5 is a shematic diagram showing a epicycloidal equidistant conjugate helical gear mechanism of internal meshing, multi-tooth difference and single-point contact.
Figure 6:
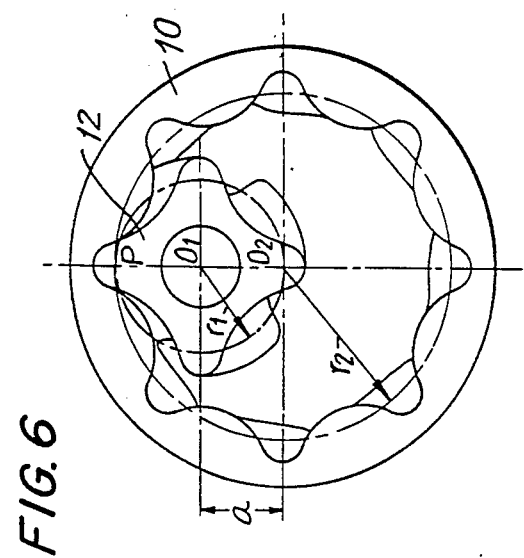
FIG. 6 is a schematic diagram showing a hypocycloidal equidistant conjugate helical gear mechanism of internal meshing multi tooth-difference and single-point contact.

FIG. 5 and FIG. 6 are the conjugated gear mechanisms of the internal meshing, tooth-number-difference larger than one tooth, epicycloidal equidistant helical tooth multi-tooth-difference internal meshing, one point contacting gears (9,11) and the hypocycloidal equidistant helical tooth, multi-tooth-difference internal meshing, one point contacting gears (10, 12), respectively. In general, their cross section tooth profiles are epicycloidal equidistant curves.

Figure 7:
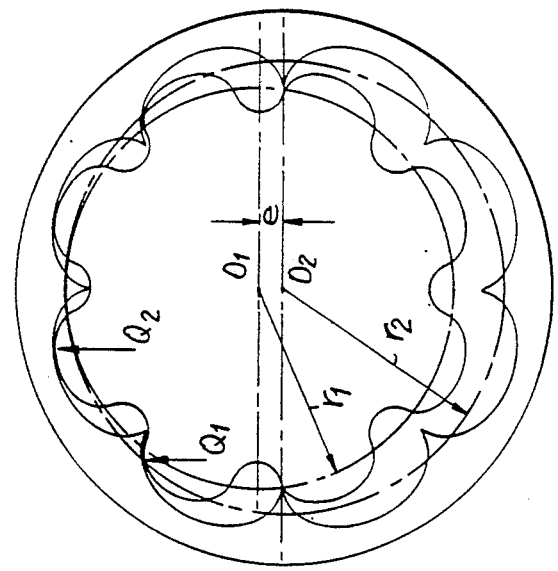
FIG. 7 is a schematic diagram showing an epicycloidal equidistant curved gear mechanism of internal machine zero-tooth-difference and multi-point contacts. (The center distance is equal to the difference of the equidistances).
Figure 8:
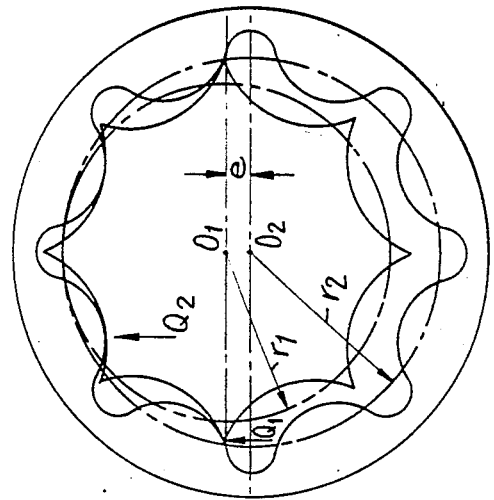
FIG. 8 is a schematic diagram showing a hypocycloidal equidistant curved gear mechanism of internal meshing, zero-tooth difference and multi-point contacts (the center distance is equal to the difference of the equidistances).

In regard to hypo- and epicycloidal equidistant zero tooth difference internal meshing conjugated gear mechanism of the present invention, its center equidistance as shown in FIGS. 7 and 8, the tooth profile curves of these mechanisms must also be in curves of equidistance and enveloping each other as well as producing multi-point contacts in order to meet the requirements. In practical applications, about one half of the gears participate in meshing and about one fourth of the gears receive force as showed by test, indicating quite favorable conditions.

In case of external meshing and tooth number difference less than one tooth, the internal meshing is generally with helical gears as shown in FIG. 4.

Figure 9:
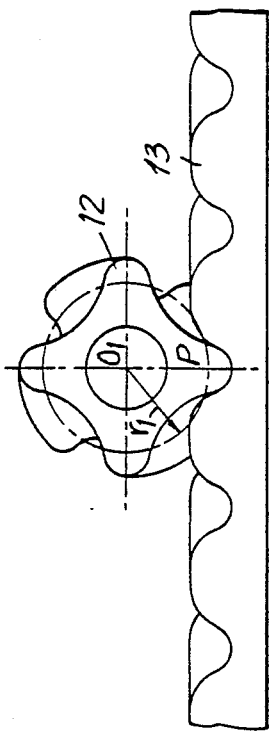
FIG. 9 is a schematic diagram showing the meshing mechanism of a hypocycloidal equidistant curved helical gear with a cycloidal equidistant curved helical rack.
Figure 10:
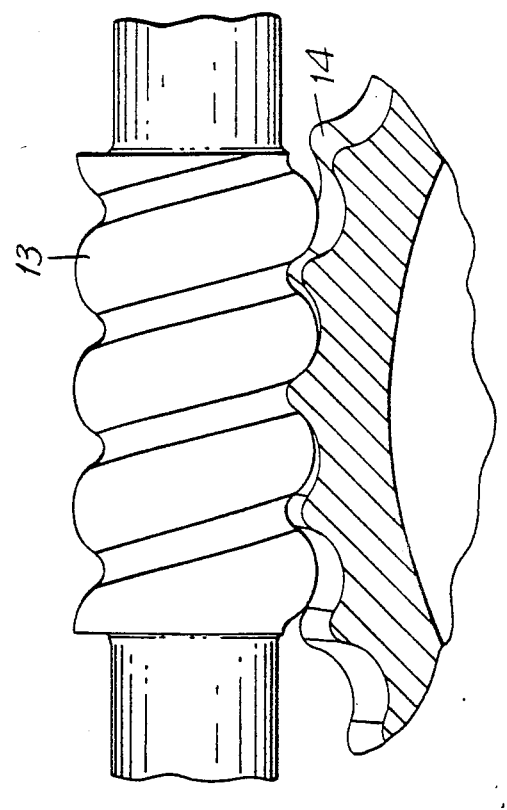
FIG. 10 is a schematic diagram showing the meshing transmission mechanism of a cycloidal equidistant curved worm and a wormgear.

FIG. 9 is a helical gear (12) and a helical gear rack (13) and FIG. 10 is a worm gear (14) and a worm (15) mechanisms, respectively.

Double cycloid equidistant gear pumps and oil motors represent specific embodiments of the cycloidal equidistant gear mechanism which is constituted on the basis of arc-pancycloidal rotor pump and by modifying the arc tooth profile therein with the incorporation of gears having conjugated and mutually envelopable cycloidal equidistant tooth forms.

Figure 11B:
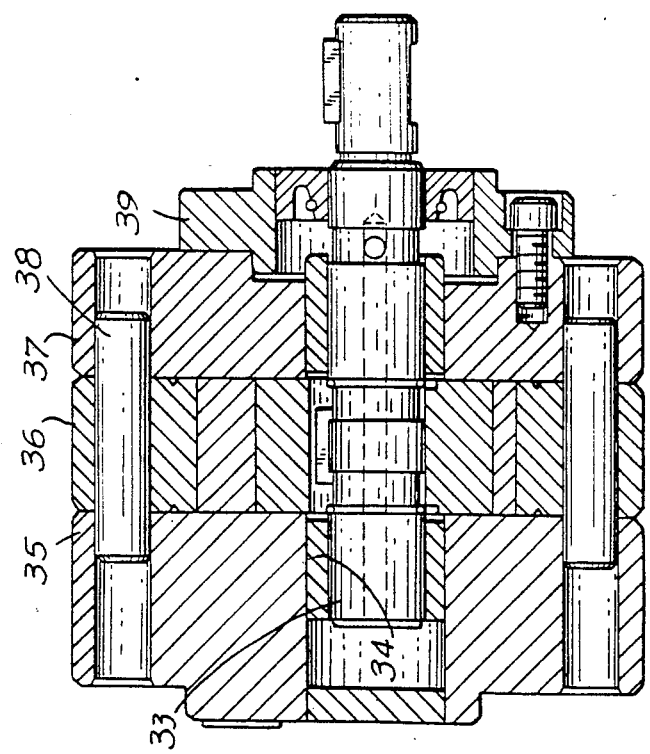
FIGS. 11a and 11b are schematic diagrams of a rotor pump (or oil motor) constituted by double hypocycloidal equidistant curved gears of one-tooth-difference and internal meshing.
Figure 11A:
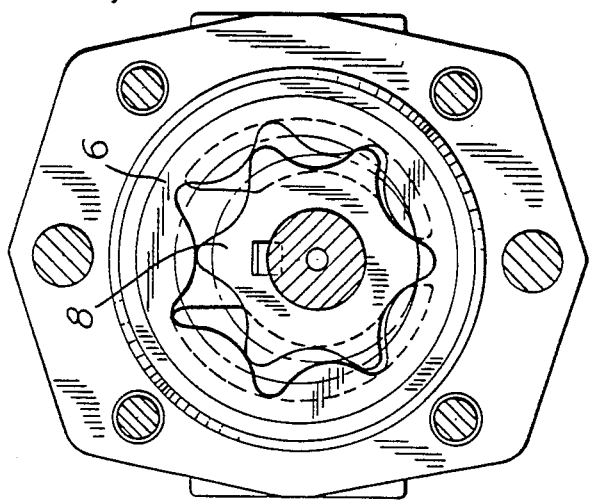

FIG. 11 is a kind of double hypocycloidal equidistant one-tooth difference meshing gear rotor pump (or oil motor), wherein the inner rotor's hypocycloidal equidistant external gear (8) fixed on axis (33), external rotor's inner gear (6) located in the mid-pump plate (36) is fixed with positioning rim (38) etc., and the tooth profiles of the external rotor (40) and internal rotor (8) cooperate with each other and they are eccentric with respect to each other. The rotation axis (33) produces rolling-friction to rotate the internal rotor along the external rotor by virtue of its sliding on the bearing (34). By this means the input of low pressure oil is rotary compressed to output high pressure oil (not shown in the diagram).

Figure 12B:
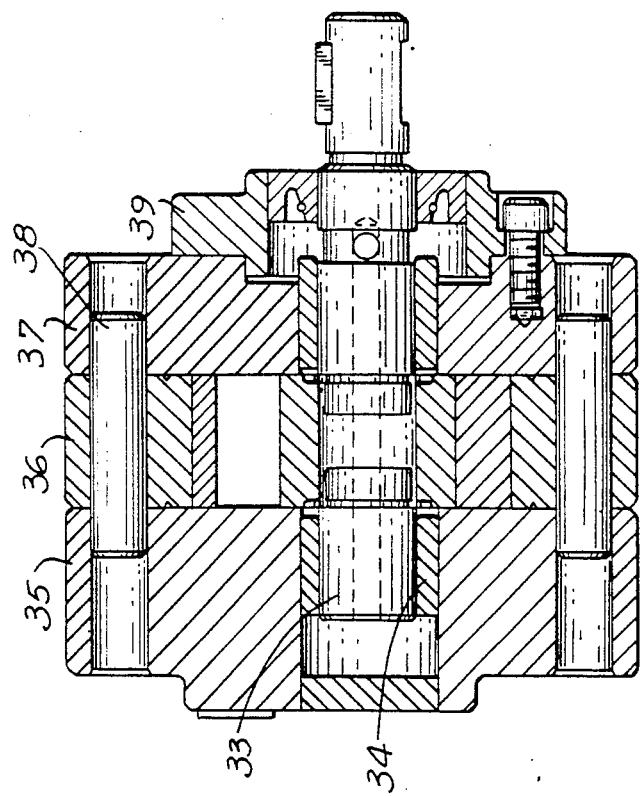
FIGS. 12a and 12b are schematic diagrams showing the construction of a rotor pump (or oil motor) constituted by double epicycloidal equidistant curved gears of one-tooth-difference and internal meshing.
Figure 12A:
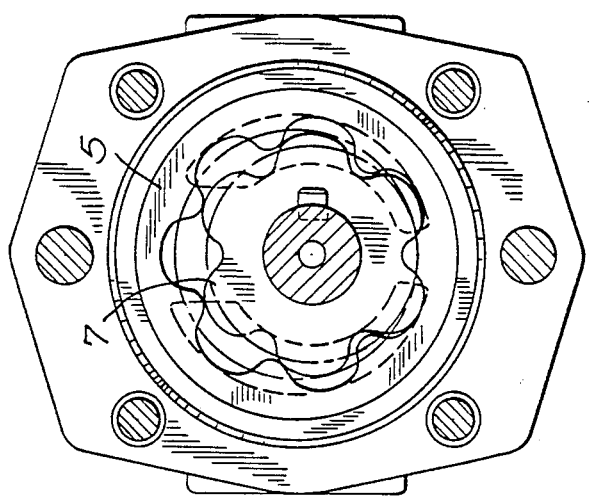

FIG. 12 is a kind of double epicycloidal equidistant one tooth-number-difference inner meshing gear pump (or oil motor), wherein the variations in structure of the epicycloidal equidistant internal rotor (7) and the epicycloidal equidistant external rotor (5) are, by and large, similar to FIG. 11.

FIG. 13 is a kind of hypo- and epicycloidal equidistant external meshing gear-rotor pump which, among other things, is basically similar to the conventional gear pump, except it incorporates epicycloidal equidistant gear (7) and hypocycloidal equidistant gear (8) of the present invention. Such a pump, with cooperating evolute gears, functions as a delivery pump.

Since such double cycloidal rotor pumps or oil motors are more nearly perfect in meshing, they significantly exceed the technical performance index of arc-rancycloidal rotor pumps or oil motors and, in addition, using external meshings (with zero tooth-number-difference in this case), it is quite promising that in the near future such double cycloidal equidistant rotor pumps will take the place of conventional rotor pumps or oil motors.

As mentioned above, the rotor pumps are incorporate double cycloidal equidistant conjugated tooth profiles with internal and external rotors of cycloidal equidistant line. They have the advantages of increased coincidence due to multiple point contacts, excellent stability, small sliding coefficient, good sealing between tooth profiles, small pressure angle, powerful transmission force and high efficiency, therefore, are suitable for high pressure oil pumps.

The force analysis of the internal meshing cycloidal equidistant gears with one-tooth-number-difference is as follows.

$F_x$ is the normal force on the tooth profile at the contact point.

Figure 17:
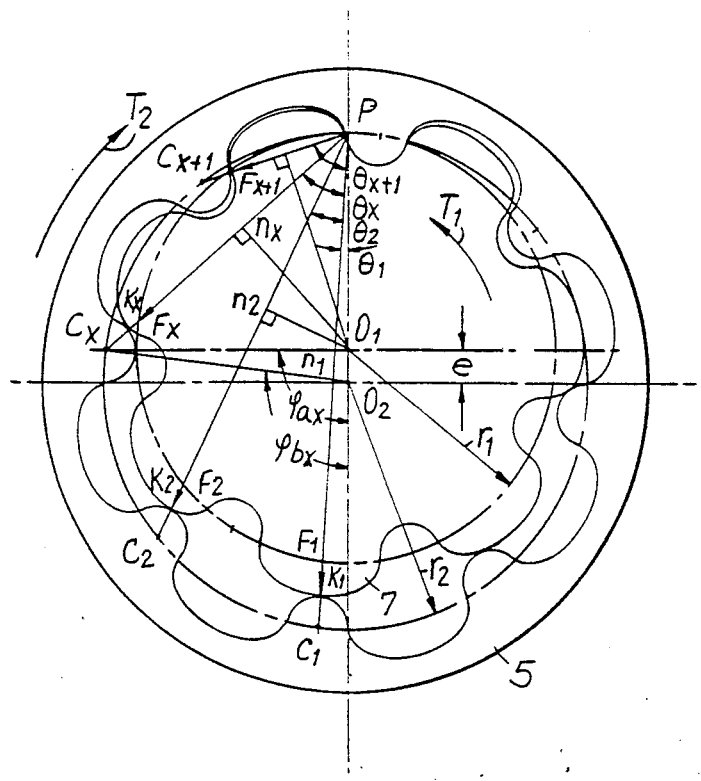
FIG. 17 is a force analysis diagram of the cycloidal equidistant curved gears with one-tooth difference and internal meshing.

As shown in FIG. 17, the internal gear (5) is taken as the separator, and under the action of the external torque T, the external gear (7) causes the gear teeth $C_1$, $C_2 \ldots C_x$ to receive at contact points $K_1, K_2, \ldots K_x$ respectively normal forces $F_1, F_2 \ldots F_x$ respectively, which normal angles are $\theta_1\, \theta_2 \ldots \theta_x$ respectively.

So, the equivalent meshing angle $$= \tan^{-1} \frac{Fr}{Ft} = \tan^{-1} \frac{Fxy}{Fxx} = \tan^{-1} 2 = 32.48° \quad (22)$$

This meshing angle is in value far smaller than the evoluted line one tooth-number-difference internal meshing (56°) and also smaller than cycloidal lantern gear transmission angle (40°). In addition, along with the increase of the tooth-side clearance and the decrease of the normal force away from the pitch point, the equivalent meshing angle d° can be reduced further.

So far, three kinds of output mechanisms have been established; they are the internal and external binary planetary one tooth-number-difference output mechanism and the internal and external binary planetary zero tooth-number-difference output mechanism and the internal meshing 2K-H positive mechanism of binary external planetary gears. These three kinds of output mechanism are respectively suitable for different ranges of transmission ratio, i.e., i in the range of 10 to 25, i in the range of 20–50, i in the range of 50–2000.

Figure 14C:
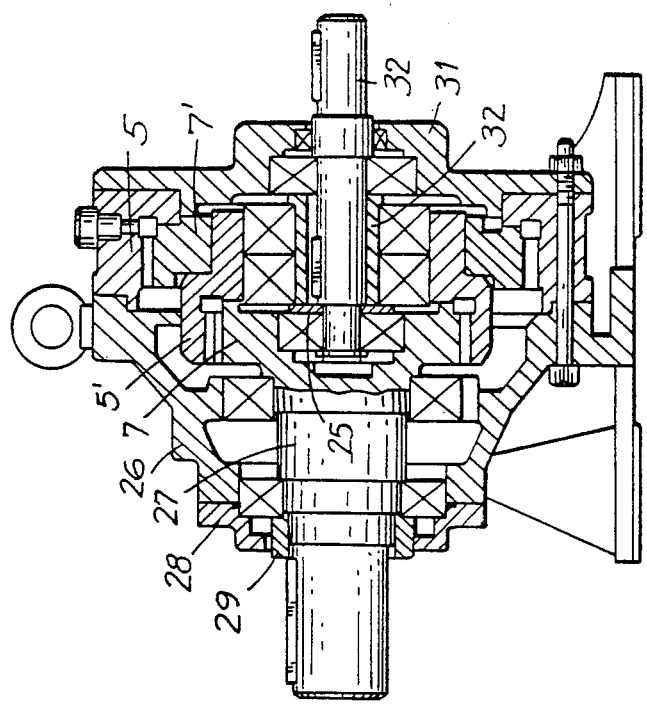
FIGS. 14a, 14b and 14c are schematic diagrams showing the construction and transmission of a planetary gear reducer constituted by epicycloidal equidistant curved binary internal and external gears with the internal gear fixed and having external gear output.
Figure 14A:
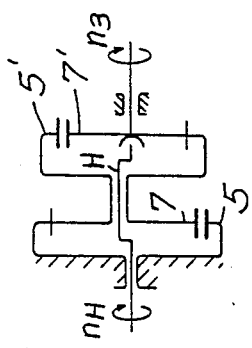
Figure 14B:
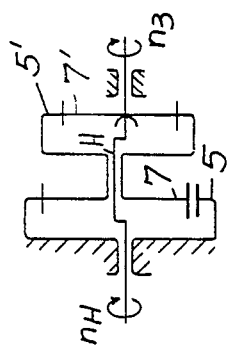

The first as shown in FIG. 14 is the epicycloidal equidistant gear reducer with the external gear (7) as output, internal gear (5) stationary and the planetary gear as the binary internal external gears (5', 7'). The transmission is of two kinds, one as one tooth-difference binary internal meshing (FIG. 14a) and the other as a pair of zero-tooth-difference or one-by-one-tooth difference (FIG. 14b). The reducer formed by them is as shown in FIG. 14c.

The second as shown in FIG. 15 is the epicycloidal equidistant gear reducer with the external gear (7) stationary the internal (5) output and the planetary gears as binary internal and external gears (5', 7'). The transmission is also divided into two kinds, one as one tooth-difference binary internal meshing (FIG. 15a) and the other as a pair of zero tooth-difference or one-by-one tooth-difference (FIG. 15b). The reducer device formed by them is as shown in FIG. 15b.

Figure 16B:
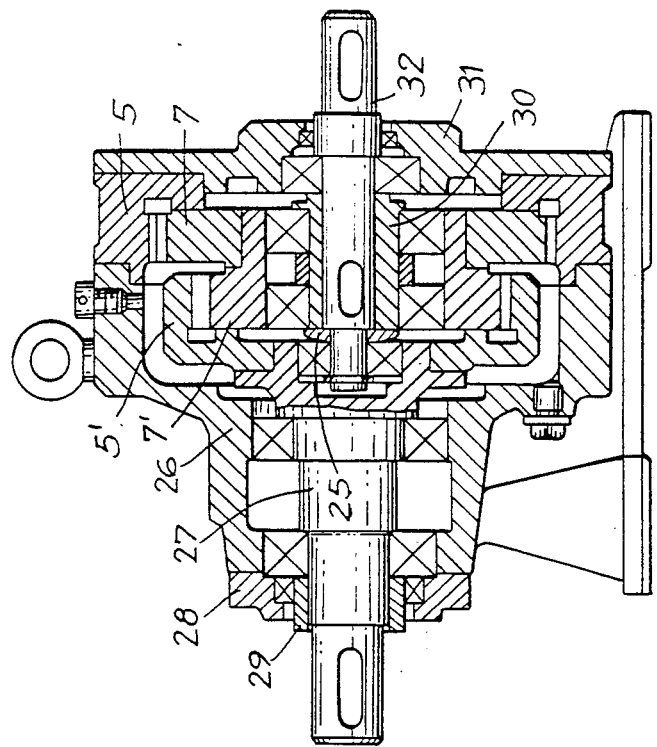
FIGS. 16a and 16b are schematic diagrams showing the construction and transmission of the epicycloidal equidistant binary internal meshing planetary gear reducer of binary planetary external gears of one-tooth difference.
Figure 16A:
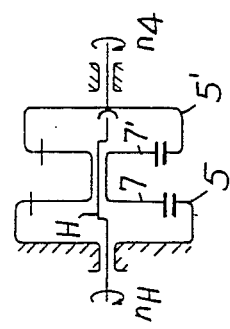

The third as shown in FIG. 16 is the planetary gear reducer with the planetary gears as binary external gear (7, 7'), the internal gear (5) stationary and the internal gear (7') output. FIG. 16a is the transmission diagram. FIG. 16b is the construction diagram of such device. Gears (5, 7) and (5', 7') are all one tooth-difference and it is the typical 2K-H position device.

The specific constructions of the epicycloidal equidistant gears' planetary reducers are shown in FIGS. 14c, 15c and 16b. In addition to internal and external gears, there are also included retainer (25), body-base (26), output shaft (27), small end cover (28), axle sleeve (29), eccentric sleeve (30), large end cover (31), input shaft (32), etc. All these parts are shaped alike except for slight differences in specific construction dimensions.

In all of these diagrams, each internal and external gear is located between the bodybase (26) and large end cover (31). The stationary internal gear (5) or external gear (7) are fastened between the body base (26) and large end cover (31) by means of studs or screws. Binary internal shaft (5', 7'), has both ends of the shaft supported with bearings and the output internal and external gears (5) or (7) are integrated by key joint with the output shaft (21).

The example as shown in FIG. 14 is a typical construction. The extended input shaft (12) is cohered with eccentric sleeve (30) and supported by a bearing that located at the large end cover (31) and a bearing that is inlaid in the flange at right end of the output shaft (27), respectively. At the external surface of the eccentric sleeve is mounted with a pair of rotational arm bearings, upon which are mounted the pair of cohered planetary gears, i.e., the planetary external gear (7) and internal gear (5'). When the input shaft (32) rotates on the stationary axis and is driving the eccentric sleeve to rotate as well as directing the binary planetary gears to make plane movement, the absolute motion of the planetary gears will be restrained by the internal sun gear (5) and will have a defined plane movement (self-spinning plus common volution). Finally, such a movement may be output by the external sungear (7') meshed with the planetary internal gear (4), therefore, the output rotation of the output shaft (27) will be the planetary gear's absolute rotation if zero tooth-difference is applied in gears 3 and 4, and will be one-half of the absolute rotation of the planetary gear if one tooth-difference is applied to gears (7') and 5'). The sungear (7') and the output shaft (27) may either be integral or joined through a flange. The internal sun gear (5) is attached to the body-base (26) as a pair of the housing through the flange and the large end cover (31) is cohered to the large sun gear (5), also through a flange. The output shaft (27) is supported at the body-base (26) using two bearings and it is in a coaxial line with the output shaft (32).

It is claimed that:

1. A cycloidal equidistant curved gear transmission mechanism including at least a pair of gears, each gear having a tooth profile, said pair of gears comprising a first gear having teeth generated by an equidistant curve of a whole branch cyclic cycloid-type located at a side of a center of curvature of that cycloid, and a second gear having teeth which matingly engage with said teeth of said first gear, with a rolling circle of each said first and second gears being of the same diameter, the epicycloidal gears being inner equidistant curves and the hypocycloidal gears being the external equidistant curves, wherein in external meshing, said first gear is an epicycloidal inner-equidistant curved gear and said second gear is a hypocycloidal outer-equidistant curved gear and said first and second gears are conjugated with each other; and wherein in internal meshing said first gear is an epicycloidal inner-equidistant curved gear and said second gear is a hypocycloidal outer-equidistant curved gear and said first and second gears are respectively conjugated with each other, and in internal and external meshing, the difference of the number of teeth of said first and second gears is greater than or equal to unity.

2. The gears as claimed in claim 1 wherein in said external meshing and internal meshing said pair of gears comprises a helical gear and a worm screw.

3. The gears as claimed in claim 1 wherein said epicycloidal gear has more teeth than said hypocycloidal gear.

4. The gears as claimed in claim 1 wherein said epi- or hypo-cycloidal equidistant curved gears one-tooth-difference conjugated gear mechanism is used as a rotor pump mechanism (or oil motor mechanism) in which an external gear (7,8) is mounted on a shaft (33) slidably or rollably supported through bearings (34) and an internal gear (6) or (5) is mounted in a midpump-plate and fixed to back and front pump-plates (35) and (37) by positioning a ring (38) with a pump body having oil inlet and outlet openings.

5. The gears as claimed in claim 1 wherein said hypo- or epicycloidal equidistant curved gears with zero-tooth-difference (7,8) are suitable for gear rotor pumps.

* * * * *

UNITED STATES PATENT AND TRADEMARK OFFICE
CERTIFICATE OF CORRECTION

PATENT NO. : 4,922,781

DATED : May 8, 1990

INVENTOR(S) : PEIJI

It is certified that error appears in the above-identified patent and that said Letters Patent is hereby corrected as shown below:

Column 3, line 18, "shematic" should read --schematic--.

Column 5, lines 44 and 45,

" $x=r\left[(Z+1)\sin\theta-\sin(Z-1)\theta+\dfrac{\sin(Z+1)\theta-\sin\theta}{(2-2\cos Z\theta)^{1/2}}\right]$ "

should read

-- $x=r\left[(Z+1)\sin\theta-\sin(Z+1)\theta+\dfrac{\sin(Z+1)\theta-\sin\theta}{(2-2\cos Z\theta)^{1/2}}\right]$ --

Column 6, lines 3 and 4,

" $\theta=\dfrac{1}{Z}\cos^{-1}\left\{1-\dfrac{[Z+2]^2}{(Z+1)8^{1/2}}\right\}$ "

should read

-- $\theta_* = \dfrac{1}{Z}\cos^{-1}\left\{1-\left[\dfrac{Z+2}{(Z+1)8^{1/2}}\right]^2\right\}$ --.

Column 6, lines 12 and 13,

" $\dfrac{2Z(\cos\theta-\cos(Z+1)\theta)}{(2-2\cos Z\theta_*)^{1/2}}$ "

should read

-- $\dfrac{2Z(\cos\theta-\cos(Z+1)\theta_*)}{(2-2\cos Z\theta_*)^{1/2}}$ --.

UNITED STATES PATENT AND TRADEMARK OFFICE
CERTIFICATE OF CORRECTION

PATENT NO. : 4,922,781

DATED : May 8, 1990

INVENTOR(S) : PEIJI

It is certified that error appears in the above-identified patent and that said Letters Patent is hereby corrected as shown below:

Column 6, lines 27 and 28, $$ \text{“} \quad p = r \left[ \frac{(z+1)8^{\frac{1}{2}}}{z+2} (1 - \cos z\,\theta)^{\frac{1}{2}} - 1 \right] \quad \text{”} $$

should read $$ -- \quad p = -r \left[ \frac{(z+1)8^{\frac{1}{2}}}{z+2} (1 - \cos z\,\theta)^{\frac{1}{2}} - 1 \right] \quad -- $$

Column 7, lines 3 and 4, $$ \text{“} \quad x = r \left[ (Z-1)\sin\theta - \sin(Z-1)\theta + \frac{\sin(Z-1)\theta + \sin\theta}{(2 - 2\cos Z\theta)} \right]^{\frac{1}{2}} \quad \text{”} $$

should read $$ -- \quad x = r \left[ (Z-1)\sin\theta - \sin(Z-1)\theta + \frac{\sin(Z-1)\theta + \sin\theta}{(2 - 2\cos Z\theta)^{\frac{1}{2}}} \right] \quad --. $$

Column 7, lines 6 and 7, $$ \text{“} \quad y = r \left[ (Z-1)\cos\theta + \cos(Z-1)\theta + \frac{\cos\theta - \cos(Z-1)\theta}{(2 - 2\cos Z\theta)} \right]^{\frac{1}{2}} \quad \text{”} $$

should read $$ -- \quad y = r \left[ (Z-1)\cos\theta + \cos(Z-1)\theta + \frac{\cos\theta - \cos(Z-1)\theta}{(2 - 2\cos Z\theta)^{\frac{1}{2}}} \right] \quad --. $$

UNITED STATES PATENT AND TRADEMARK OFFICE
CERTIFICATE OF CORRECTION

PATENT NO. : 4,922,781

DATED : May 8, 1990

INVENTOR(S) : PEIJI

It is certified that error appears in the above-identified patent and that said Letters Patent is hereby corrected as shown below:

Column 11, line 9, "and 5')" should read
-- and (5') --.

Column 11, line 12, "pair" should read
-- part --.

Signed and Sealed this

Eleventh Day of August, 1992

Attest:

DOUGLAS B. COMER

Attesting Officer      Acting Commissioner of Patents and Trademarks